United States Patent
Matthey et al.

(10) Patent No.: US 10,466,664 B2
(45) Date of Patent: Nov. 5, 2019

(54) EVALUATION DEVICE, EVALUATION METHOD, AND EVALUATION PROGRAM FOR POWER STORAGE SYSTEM

(71) Applicant: Hitachi, Ltd., Chiyoda-ku, Tokyo (JP)

(72) Inventors: Fanny Matthey, Tokyo (JP); Kenji Takeda, Tokyo (JP); Takashi Kamijoh, Tokyo (JP); Yuuji Nagashima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 831 days.

(21) Appl. No.: 14/926,767

(22) Filed: Oct. 29, 2015

(65) Prior Publication Data

US 2016/0124483 A1 May 5, 2016

(30) Foreign Application Priority Data

Oct. 30, 2014 (JP) ................................. 2014-221805

(51) Int. Cl.
*G05B 15/02* (2006.01)
*H02J 3/32* (2006.01)
*G06Q 10/06* (2012.01)
*H02J 3/00* (2006.01)

(52) U.S. Cl.
CPC ....... *G05B 15/02* (2013.01); *G06Q 10/06375* (2013.01); *H02J 3/32* (2013.01); *H02J 3/008* (2013.01); *H02J 2003/007* (2013.01); *Y02E 40/10* (2013.01); *Y02E 40/76* (2013.01); *Y02E 60/76* (2013.01); *Y04S 10/545* (2013.01); *Y04S 40/22* (2013.01); *Y04S 50/10* (2013.01)

(58) Field of Classification Search
CPC ..... G05B 15/02; G06Q 10/06375; H02J 3/32; H02J 2003/007; H02J 3/008; Y02E 60/76; Y02E 40/76; Y02E 40/10; Y04S 10/545; Y04S 50/10; Y04S 40/22
USPC ........................................................ 700/291
See application file for complete search history.

(56) References Cited

U.S. PATENT DOCUMENTS

| 2008/0114499 A1* | 5/2008 | Hakim | G06Q 50/06 700/291 |
| 2011/0288691 A1* | 11/2011 | Abe | F03D 7/00 700/292 |
| 2012/0181870 A1* | 7/2012 | Ichikawa | H02J 3/32 307/64 |

(Continued)

FOREIGN PATENT DOCUMENTS

WO WO 2011/042943 A1 4/2011

*Primary Examiner* — Christopher E. Everett
(74) *Attorney, Agent, or Firm* — Crowell & Moring LLP

(57) ABSTRACT

An evaluation device carries out evaluation for BESS that is a power storage system that includes a chargeable and dischargeable battery and provides a power stabilization service with respect to a power transmission network by using the battery. The evaluation device includes an information acquisition unit that acquires input information including at least specification information relating to specifications of the BESS, an estimation unit that estimates a life of the battery and a pecuniary profit in compensation for the service on the basis of the input information that is acquired by the information acquisition unit, and an optimization unit that determines a value of a control parameter, which is optimal for control of an operation of the BESS, on the basis of the life of the battery and the pecuniary profit which are estimated by the estimation unit.

9 Claims, 10 Drawing Sheets

(56) References Cited

U.S. PATENT DOCUMENTS

| | | | | |
|---|---|---|---|---|
| 2012/0223670 A1* | 9/2012 | Kinjo | ............................ | H02J 3/32 320/103 |
| 2014/0070756 A1* | 3/2014 | Kearns | ....................... | H02J 7/007 320/101 |
| 2014/0214223 A1* | 7/2014 | Tsunoda | ....................... | H02J 3/24 700/292 |
| 2014/0365027 A1* | 12/2014 | Namba | ........................ | H02J 3/32 700/297 |
| 2015/0357854 A1* | 12/2015 | Watanabe | .................... | H02J 3/32 320/134 |
| 2016/0064934 A1* | 3/2016 | Zhao | ........................... | H02J 3/32 700/287 |
| 2016/0159239 A1* | 6/2016 | Shi | ........................ | B60L 11/1842 320/134 |

\* cited by examiner

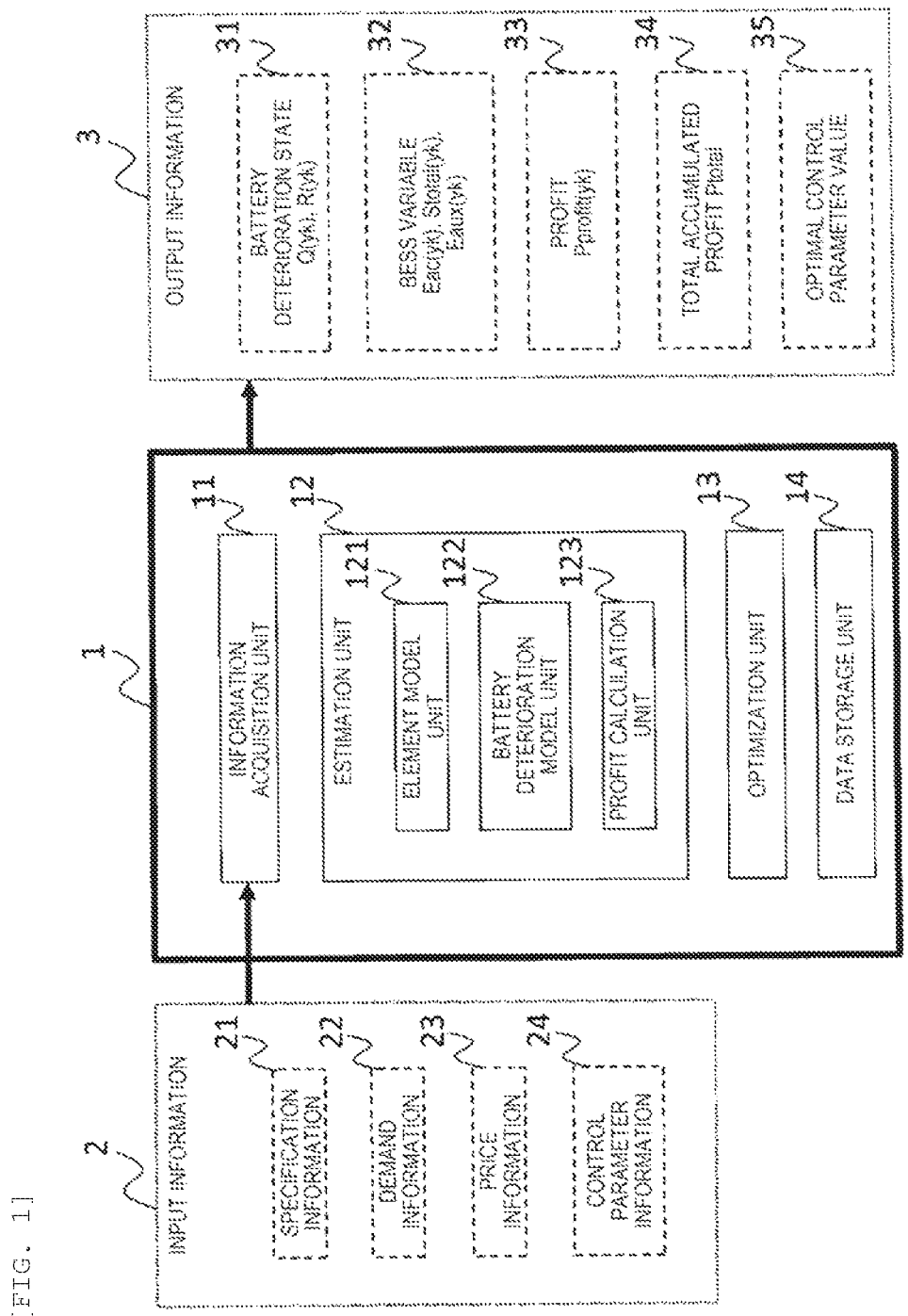
[FIG. 1]

[FIG. 2]

| Field | Unit |
|---|---|
| NAME: | |
| NUMBER OF SERIES BATTERIES PER ONE STRING: | [-] |
| NUMBER OF STRINGS: | [-] |
| NUMBER OF PCSs: | [-] |
| RATING OUTPUT OF PCS: | [kW] |
| NUMBER OF STRING PER ONE PCS: | [-] |
| NUMBER OF AIR CONDITIONING FANS: | [-] |
| AIR FLOW RATE: | [m³/h] |
| POWER CONSUMPTION OF AIR CONDITIONING FAN: | [W] |
| CAPABILITY OF AIR CONDITIONING SYSTEM: | [BTU] |
| EFFICIENCY OF AIR CONDITIONING SYSTEM: | [BTU/W·h] |
| INITIAL CAPACITY OF BATTERY ($Q_{initial}$): | [Ah] |
| INITIAL INTERNAL RESISTANCE OF BATTERY ($R_{initial}$): | [Ω] |
| INITIAL VALUE OF SOC: | [%] |
| SOC PERMISSIBLE RANGE: MINIMUM | [%] |
| MAXIMUM | [%] |

21

POWER DEMAND PROFILE  IMPORT/SELECTION/NEW CREATION

22

OPERATION MANAGER OF POWER TRANSMISSION NETWORK:

| PRICE | 0 HOUR TO 1 HOUR | 1 HOUR TO 2 HOURS | ... | 23 HOURS TO 24 HOURS |
|---|---|---|---|---|
| 1ST YEAR | | | ... | |
| 2ND YEAR | | | ... | |
| YTH YEAR | | | ... | |

23

OPERATION CONTROL PARAMETER

| | 0 HOUR TO 1 HOUR | 1 HOUR TO 2 HOURS | ... | 23 HOURS TO 24 HOURS |
|---|---|---|---|---|
| PARAMETER X1 | | | ... | |
| PARAMETER X2 | | | ... | |
| PARAMETER XM | | | ... | |

MANUAL MODE    OPTIMIZATION MODE

24

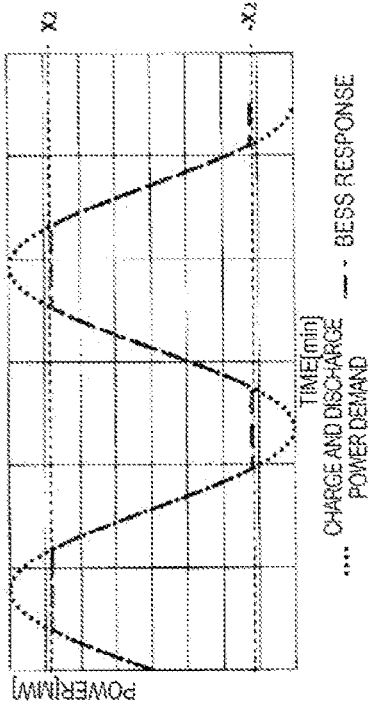
[Fig. 3A]
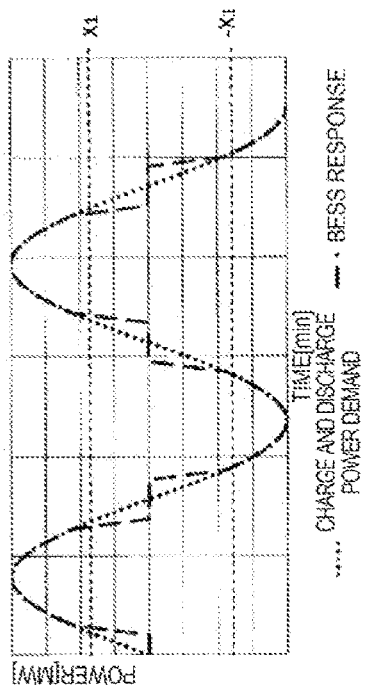
[Fig. 3B]
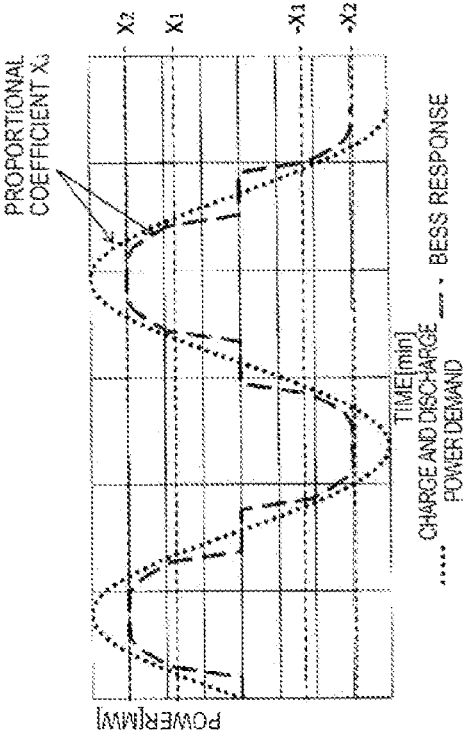
[Fig. 3C]
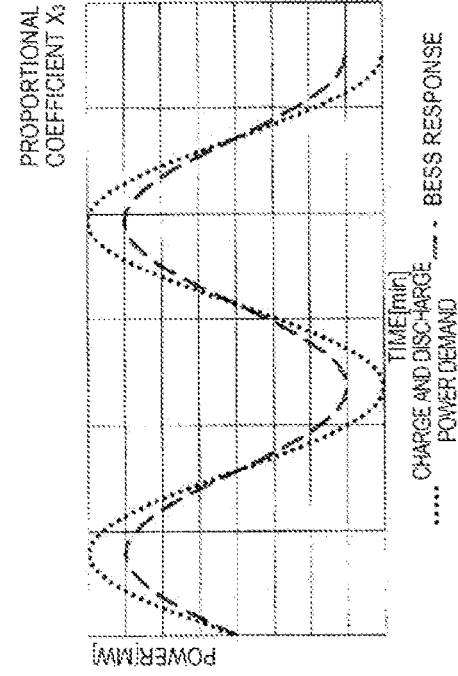
[Fig. 3D]

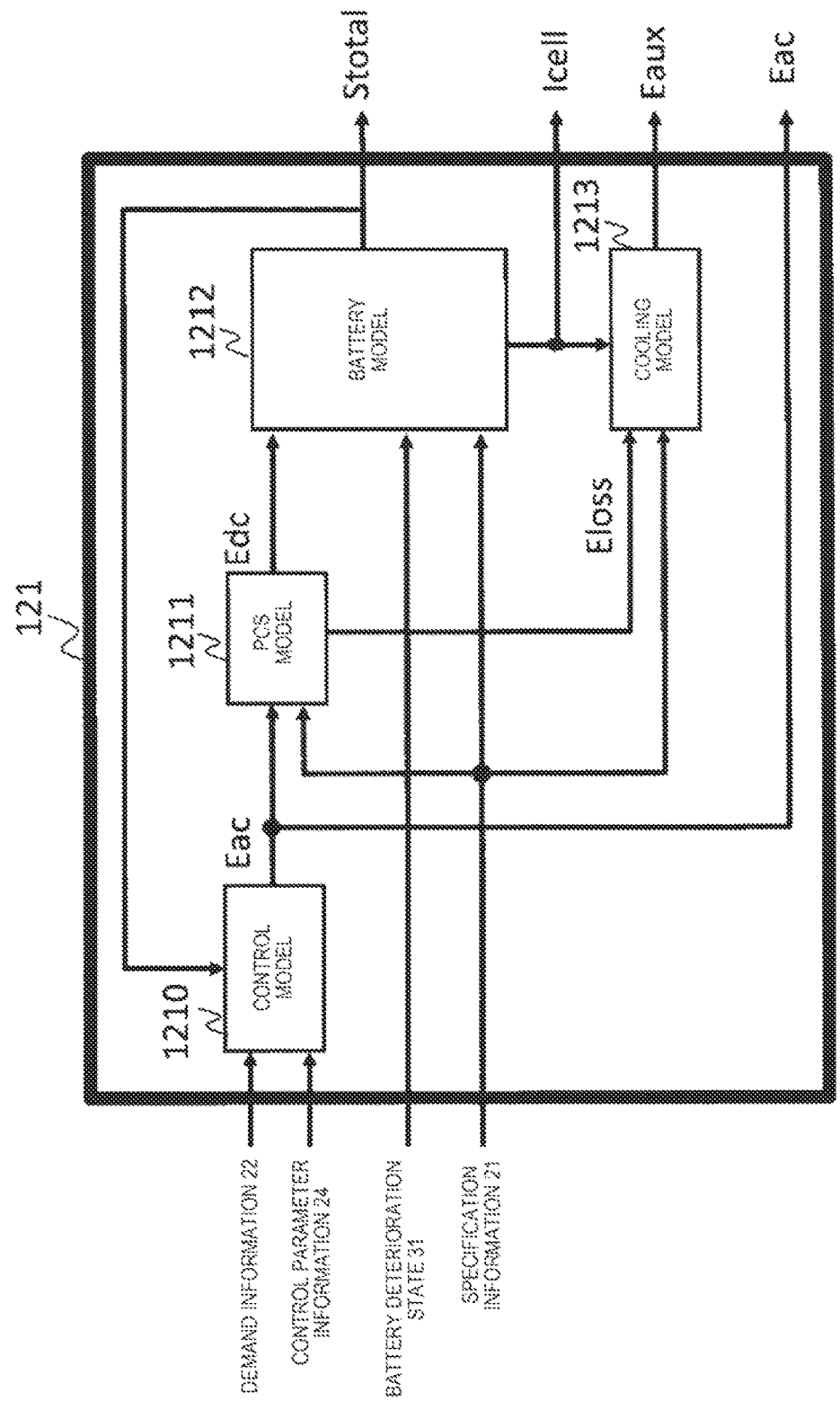
[FIG. 4]

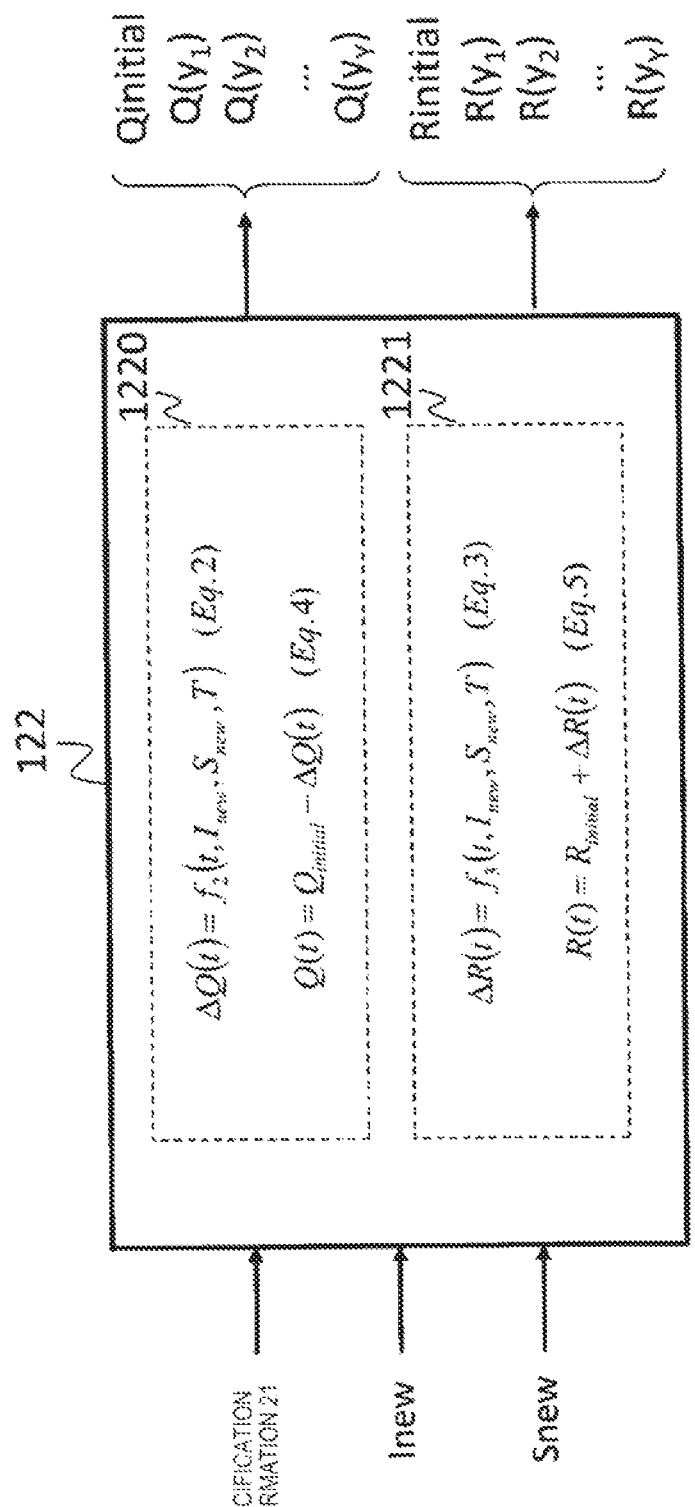
[FIG. 5]

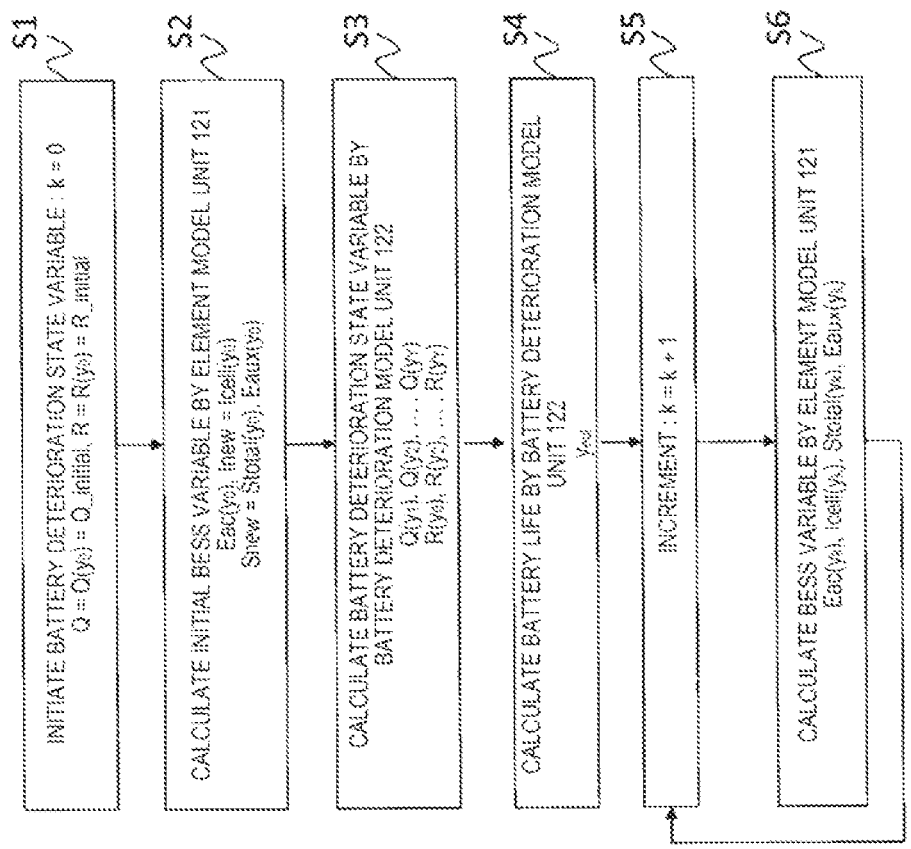
[FIG. 6]

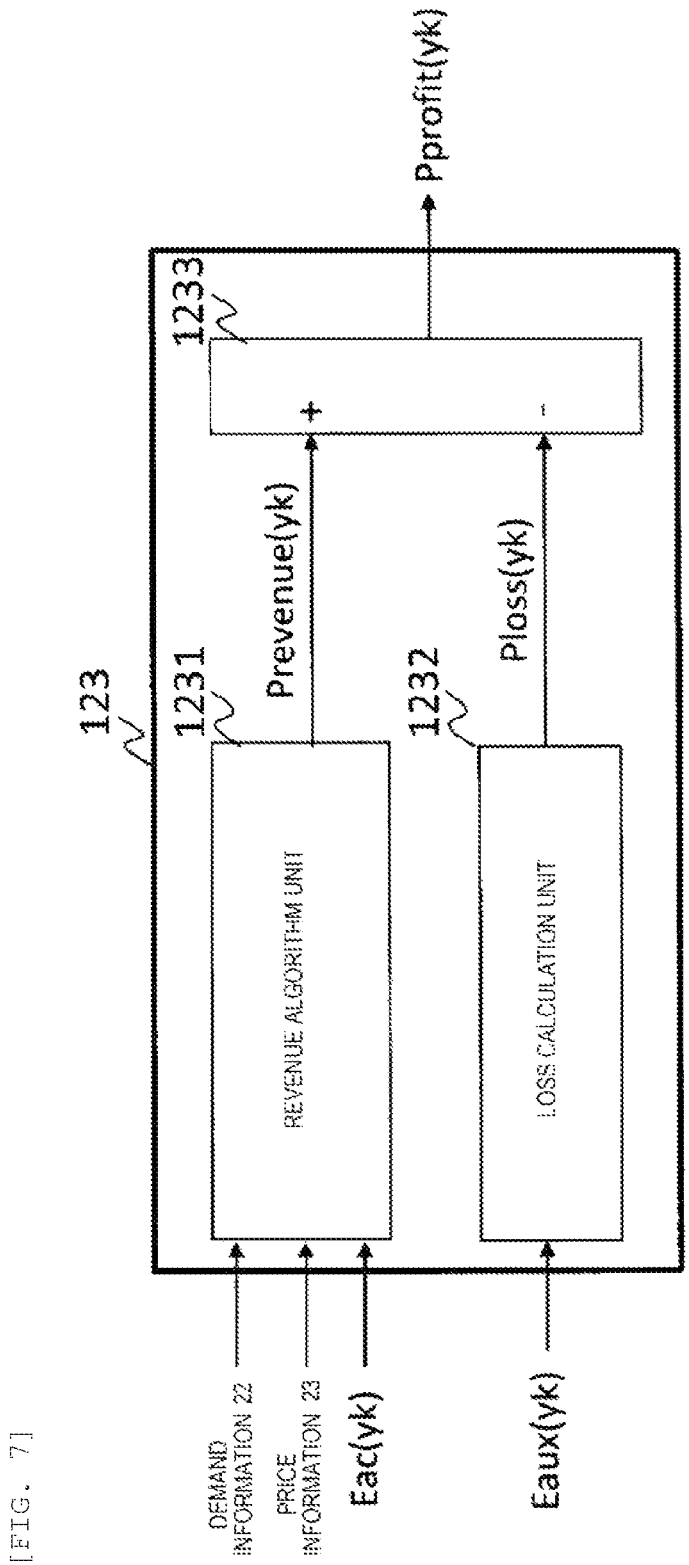
[FIG. 7]

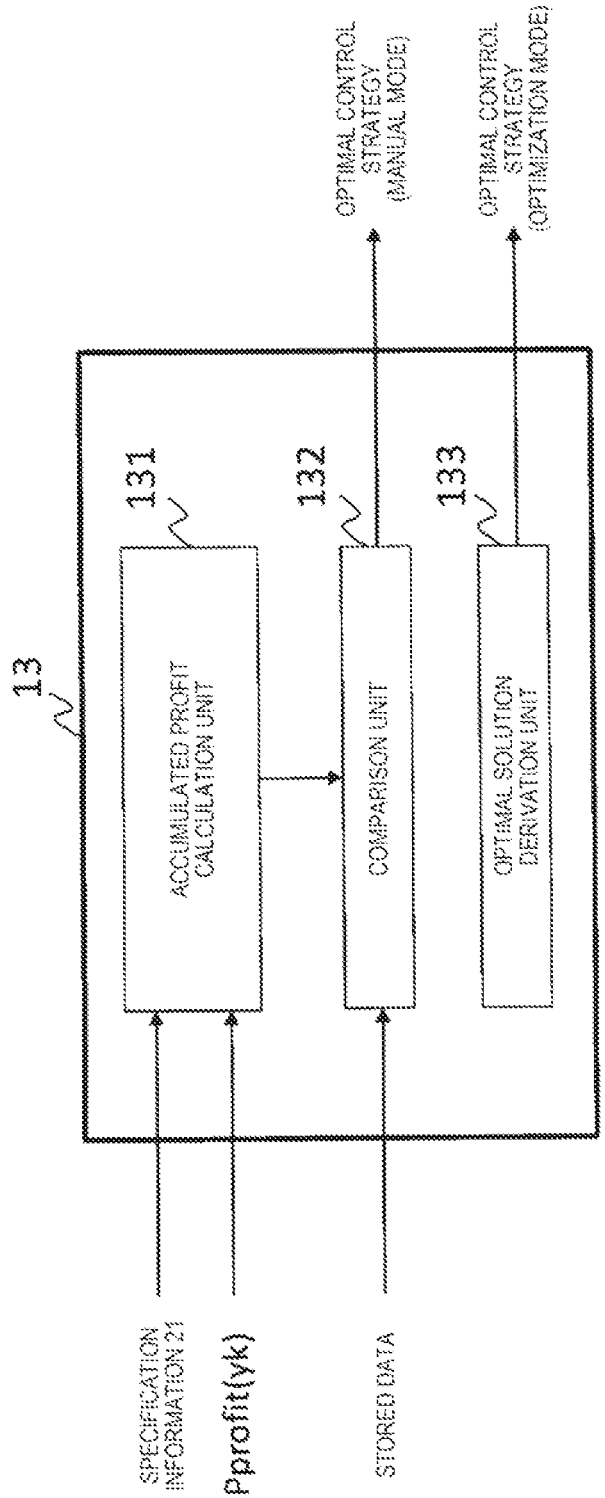
[FIG. 8]

[FIG. 9]
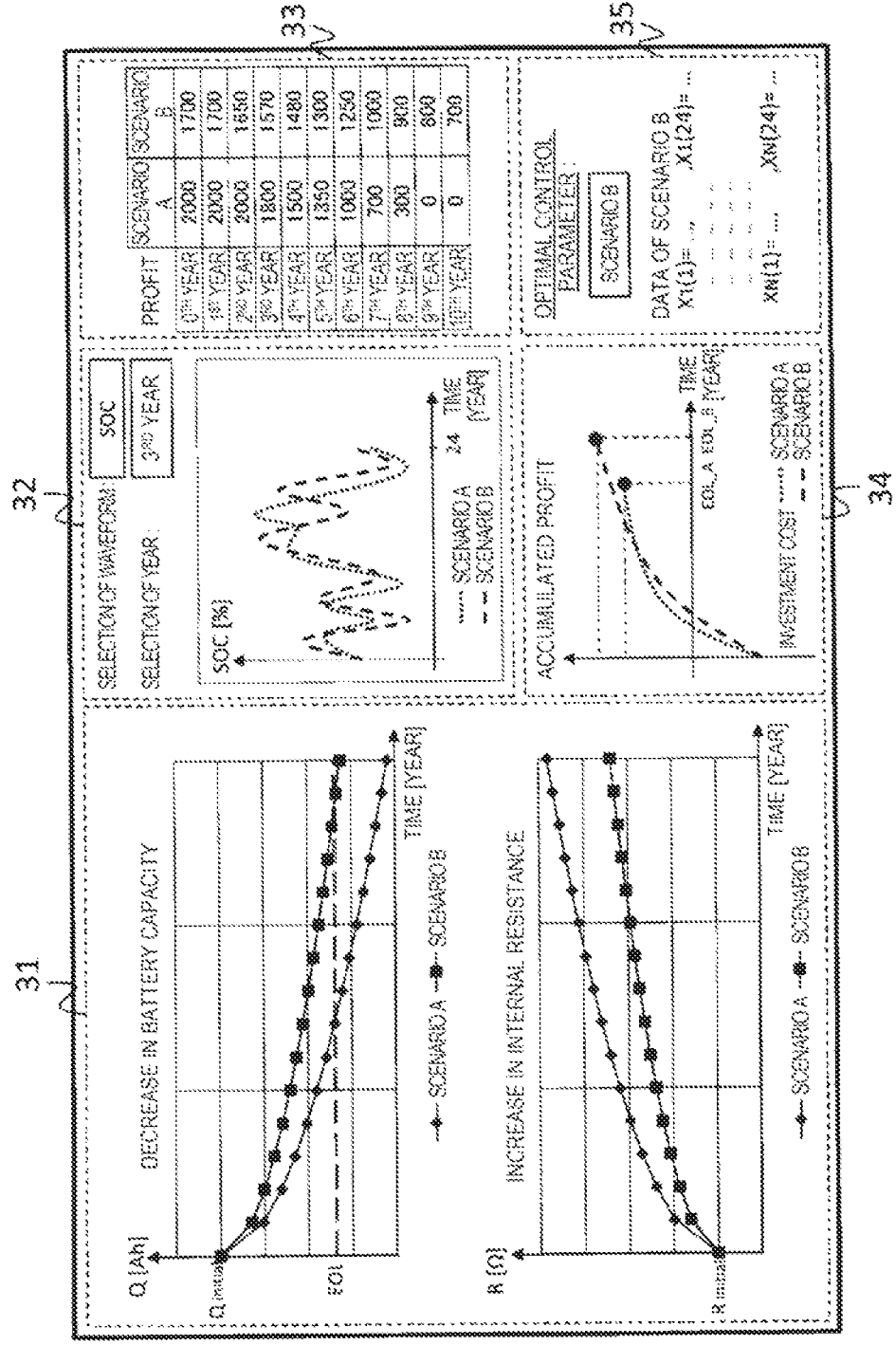

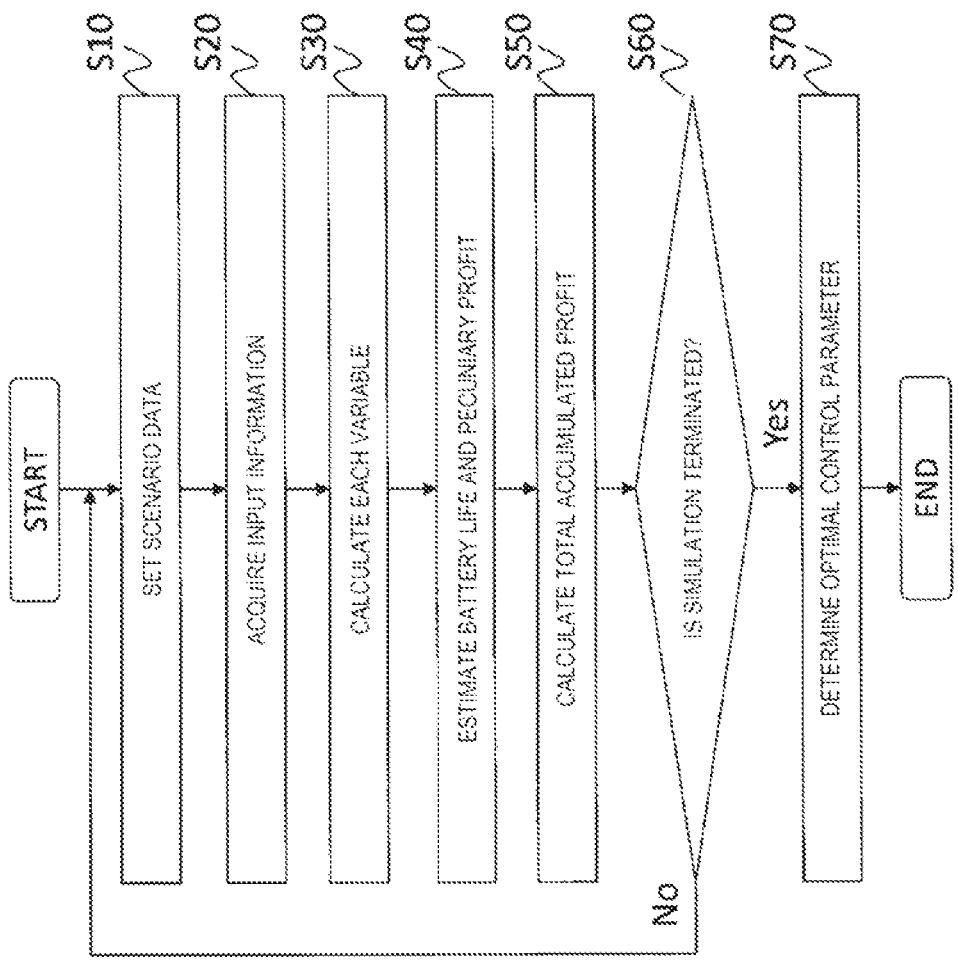
[FIG. 10]

EVALUATION DEVICE, EVALUATION METHOD, AND EVALUATION PROGRAM FOR POWER STORAGE SYSTEM

BACKGROUND OF THE INVENTION

Field of the Invention

The present invention relates to an evaluation device, an evaluation method, and an evaluation program for evaluation of a power storage system.

Background Art

Recently, from the viewpoint of a global warming problem, introduction of a power system, which carries out power generation by using renewable energy such as solar light and wind power, has become more important. However, in power generation using the renewable energy, power fluctuation occurs in a unit from a second to a minute in accordance with a variation in weather conditions, and thus there is a concern that the power fluctuation may have an adverse effect on stability of a frequency or a voltage of power that flows through a power transmission network.

With regard to the above-described problem, there is known a service provider who provides a power stabilization service with respect to the power transmission network to an operation manager of the power transmission network for profit. The service provider carries out charge and discharge with the power transmission network as necessary by using a power storage system (also, referred to as a battery energy storage system, (BESS)) that is capable of storing or emitting power by using a battery. According to this, the power stabilization service is provided by suppressing the variation in the frequency or the voltage of power that flows through the power transmission network, whereby the service provider obtains a pecuniary profit.

Charge and discharge performance or a life of the BESS varies in accordance with operational conditions of the BESS, or environmental conditions under which the BESS is placed. In addition, an amount of the pecuniary profit, which is obtained by the service provider from the operation manager of the power transmission network in compensation for the power stabilization service, is affected by responsiveness of the BESS with respect to a request from the operation manager in accordance with a power demand of the power transmission network. According to this, it is preferable that the service provider evaluates the BESS in order for both she life of she BESS and the pecuniary profit in compensation for the power stabilization service to be maximized, and sets values of parameters which are used for operational control of the BESS.

In the related art, there is suggested a device that carries out trial calculation of a relationship between initial investment and cost effectiveness during a service life, with respect to a power storage system that is provided in a power consumption place such as a house, and selects specifications of the power storage system on the basis of a calculation result (refer to Pamphlet of International Publication No. 2011/042943).

SUMMARY OF THE INVENTION

However, in the device described in Pamphlet of International Publication No 2011/042943, a consideration is not given to an operation control state of the power storage system. According to this, the device is not appropriate for evaluation of the BESS which is a power storage system that is used by above-described service provider.

According to an aspect of the invention, there is provided an evaluation device for evaluating a power storage system which includes a chargeable and dischargeable battery and provides a power stabilization service with respect to a power transmission network by using the battery. The evaluation device includes an information acquisition unit that acquires input information including at least specification information relating to specifications of the power storage system, an estimation unit that estimates a life of the battery and a pecuniary profit in compensation for the service on the basis of the input information that is acquired by the information acquisition unit, and an optimization unit that determines a value of a control parameter, which is optimal for control of an operation of the power storage system, on the basis of the life of the battery and the pecuniary profit which are estimated by the estimation unit.

According to the invention, it is possible to determine a control parameter, which is optimal for operation control, with respect to the BESS that provides a power stabilization service with respect to a power transmission network.

BRIEF DESCRIPTION OF THE DRAWINGS

FIG. 1 is a block diagram illustrating a configuration of an evaluation device for a BESS according to an embodiment of the invention;

FIG. 2 is an example of a display screen for input of input information;

FIGS. 3A to 3D are diagrams illustrating an example of a relationship between a charge and discharge power demand and BESS response in accordance with operation control parameters;

FIG. 4 is a block diagram illustrating a configuration of an element model unit in the BESS according to the embodiment of the invention;

FIG. 5 is a block diagram illustrating a configuration of a battery deterioration model unit in the BESS according to the embodiment of the invention;

FIG. 6 is a flowchart illustrating a process flow in the element model unit and the battery deterioration model unit;

FIG. 7 is a block diagram illustrating a configuration of a profit calculation unit in the BESS according to the embodiment of the invention;

FIG. 8 is a block diagram illustrating a configuration of an optimizing unit in the BESS according to the embodiment of the invention;

FIG. 9 is a diagram illustrating a screen example of a simulation result that is displayed on a GUI of the evaluation device; and FIG. 10 is a flowchart illustrating an overall process flow of the evaluation device.

DETAILED DESCRIPTION OF THE INVENTION

In the following embodiment, description will be given of an evaluation device and an evaluation method for evaluation of a power storage system that is called a BESS as described above.

In a country such as USA or a region, as an operation manager who carries out operation or maintenance management of a power transmission network, an organization called a regional transmission organization (RTO) or an independent transmission operator (ISO) exists. The operation manager of the power transmission network has an obligation to maintain a frequency or a voltage of power, which is supplied from the power transmission network to a consumer, in a constant range while using power generated by various power generation facilities. In addition, there is known a service provider who provides an auxiliary service such as frequency adjustment, supply of reactive power and voltage control, and system reactivation to the operation manager of the power transmission network for stabilization of supply power. The service provider provides the above-described power stabilization service by using the above-described BESS, and makes a profit from the operation manager of the power transmission network in compensation for the contents or a providing time of the service.

The BESS, which is provided for the power stabilization service with respect to the above-described power transmission network, typically includes a plurality of chargeable and dischargeable batteries, a power converter (also, referred to as a power conditioning system (PCS)) that carries out mutual conversion between AC power and DC power, a cooling system that adjusts a temperature in a device, and a control system that controls the entirety of the BESS. Battery characteristics are exhibited by a capacity (Ah), internal resistance (Ω), a state of charge (SOC) (%), and the like. In addition, when deterioration of the batteries is in progress, the capacity decreases, and the internal resistance increases. A battery of which the capacity or the internal resistance reaches a constant threshold value is determined as end of life (EOL).

The charge and discharge performance or the life of the battery varies in accordance with operational conditions of the BESS, or environmental conditions under which the BESS is placed. A main cause for deterioration of the battery includes a range of SOC which is used for charge and discharge of the battery, the number of charge and discharge cycles or a period thereof, a charge and discharge current, an ambient temperature, and the like. A deterioration situation of the battery has an effect on the sum of a pecuniary profit that is obtained from a power stabilization service that is provided by the BESS, and thus the deterioration situation becomes an important guideline during formulation of an instruction plan of the BESS. Accordingly, it is preferable for the service provider to carry out evaluation of the BESS in advance so as to set optimal operational conditions of the BESS. In this embodiment, description will be given of a method and a device which realize the evaluation of the BESS.

FIG. 1 is a block diagram illustrating a configuration of an evaluation device for the BESS according to an embodiment of the invention. An evaluation device 1 is configured to evaluate the BESS that is used by a service provider who provides a power stabilization service with respect to a power transmission network to an operation manager of the power transmission network for profit, and includes an information acquisition unit 11, an estimation unit 12, an optimization unit 13, and a data storage unit 14. The evaluation device 1 can realize the configuration of the components by a computer including a CPU or a storage device.

Input information 2 is input to the evaluation device 1. The input information 2 includes specification information 21 relating to specifications of the BESS that is an object to be evaluated by the evaluation device 1, demand information 22 relating to a charge and discharge power demand with respect to the BESS, price information 23 relating to the price of the power stabilization service that is provided by the BESS, and control parameter information 24 relating to control parameters which are used for operation control of the BESS. However, it can be said that not all of the plurality of pieces of information are necessary. As the input information 2, arbitrary information can be input to the evaluation device 1 in accordance with the contents of a process that is carried out by the evaluation device 1.

The information acquisition unit 11 acquires the input information 2 on the basis of information that is input from a user by using an input device such as a keyboard and a mouse (not illustrated), or information that is received through a network (not illustrated). The input information 2, which is acquired by the information acquisition unit 11, is output to the estimation unit 12.

The estimation unit 12 estimates the life of a battery that is a constituent element of the BESS, a pecuniary profit that is obtained by the power stabilization service that is provided by the BESS, and the like on the basis of the input information 2 that is acquired by the information acquisition unit 11. An estimation result obtained by the estimation unit 12 is output as output information 3 from the evaluation device 1, and is also output to the optimization unit 13 or the data storage unit 14. The estimation unit 12 includes an element model unit 121, a battery deterioration model unit 122, and a profit calculation unit 123. In addition, the respective units will be described later in detail.

The optimization unit 13 determines a value of a control parameter, which is optimal for control of an operation of the BESS, on the basis of the life of the battery and the pecuniary profit which are estimated by the estimation unit 12. The optimization unit 13 will be described later in detail.

The data storage unit 14 is a portion which stores an estimation result of the estimation unit 12, the value of the control parameter that is determined by the optimization unit 13, and the like. For example, the data storage unit 14 can be constituted by a hard disk drive, a flash memory, and the like.

The output information 3, which is output from the evaluation device 1, includes a battery deterioration state 31 that represents a deterioration state of the battery in the BESS, a BESS variable 32 that represents a BESS state, a profit 33 that represents an amount of the pecuniary profit that is obtained by the power stabilization service provided by the BESS, a total accumulated profit 34 that represents an accumulated amount of the pecuniary profit from operation initiation to operation end of the BESS, and an optimal control parameter value 35 that represents a control parameter value that is optimal for operation control of the BESS. A user can obtain an evaluation result of the BESS by confirming the plurality of pieces of information which are displayed on a graphical user interface (GUI) such as a display monitor (not illustrated) that is included in the evaluation device 1 on the basis of the output information 3. In addition, it is not necessary to output all of the plurality of pieces of information. Arbitrary information can be output as the output information 3 from the evaluation device 1 in accordance with the contents of a process that is carried out by the evaluation device 1.

The evaluation device 1 has the above-described configuration. According to this, the evaluation device 1 can estimate the life of the BESS or the total amount of the profit when a service provider provides the power stabilization service with respect to the power transmission network by using the BESS. In addition, it is possible to derive an optimal value of the operation control parameter of the BESS through mathematical modeling, an operation process and an optimization process.

FIG. 2 is an example of a display screen for input of the input information 2. On the screen of FIG. 2, input column illustrated in the drawing are provided for the specification information 21, the demand information 22, the price information 23, and the control parameter information 24 which constitute the input information 2. On the screen similar to FIG. 2 which is displayed on a display monitor (not illustrated), for example, a user can input the input information 2 to the evaluation device 1 through operation of a mouse, a keyboard, and the like.

On the screen of FIG. 2, a user can input information relating to characteristics of a battery or an air conditioning system which is illustrated in the drawing, and the like as the specification information 21 in addition to the name of the BESS. Examples of the information relating to the characteristics of the battery include a plurality of pieces of information such as the number of batteries which are connected in series per one battery string, the number of battery strings which are connected in parallel, the number of PCSs, a rating output of each of the PCSs, the number of battery strings which are connected in parallel per one PCS, initial values of a capacity and internal resistance of a battery, an initial value of an SOC at the time of initiating a charge cycle, and a permissible range (a minimum value and a maximum value) of the SOC. Examples of the information relating to the characteristics of the air conditioning system include a plurality of pieces of information such as the number of air conditioning fans, an air flow rate per one fan, power consumption, and air conditioning capability and efficiency. In addition, information, which can be input as the specification information 21, is not limited thereto.

On the screen of FIG. 2, the user can input profile information, which represents a demand variation of charge and discharge power, as the demand information 22. For example, the profile information is defined as a discrete-time signal $E_{demand}$ in a range of one day (24 hours), and is determined so as to take a positive value during charge and a negative value during discharge. For example, the user may acquire the demand information 22 from an external information source such as a database that is possessed by the operation manager of the power transmission network for which the service provider provides the power stabilization service, or select the demand information 22 from information that is acquired in advance. In addition, the user may newly create the demand information 22.

On the screen of FIG. 2, the user can input information such as a name of the operation manager of the power transmission network for which the power stabilization service is provided by using the BESS, a service providing price for each year and for each time zone as the price information 23. The operation manager of the power transmission network independently designs and operates a system for receiving the power stabilization service from a business operator who uses the BESS. It is necessary for the user to input the price information 23 corresponding to an operation manager of a power transmission network, for which a service is provided, in accordance with the system. In addition, for example, a specific price that is set in the price information 23 is determined as a market settlement price (demand equilibrium price) between the operation manager of the power transmission network and each business operator who provides a service.

On the screen of FIG. 2, the user can input information of control parameters $X_1$ to $X_N$ for respective years as the control parameter information 24. In addition, the respective control parameters $X_1$ to $X_N$ are configured in such a manner that values thereof can be designated for each time zone.

The operation manager of the power transmission network transmits a power demand signal to the BESS of each business operator who is a power stabilization service providing source. Response performance of the BESS with respect to the power demand signal is represented by a value called an actual result index, and a profit which each business operator obtains is determined on the basis of the actual result index. On the other hand, the response performance of the BESS is determined in accordance with the control parameters. The business operator controls an operation of the BESS by arbitrarily setting a value of the control parameters, and can provide the power stabilization service. According to this, it is preferable that the user sets the control parameters $X_1$ to $X_N$ so as to maximize the life of the BESS and so as to maximize the total amount of the profit. To accomplish the object, the user can select a manual mode or an optimization mode on the screen of FIG. 2. In a case of selecting the manual mode, it is necessary for the user to individually designate and input the value of the control parameters $X_1$ to $X_N$. On the other hand, in a case of selecting the optimization mode, the user may input only the minimum value and the maximum value which are permitted with respect to each of the control parameters $X_1$ to $X_N$. In this case, an optimal solution of each of the control parameters $X_1$ to $X_N$ is obtained by the evaluation device 1 in a range between the minimum value and the maximum value which are input by the user.

FIGS. 3A to 3D are diagrams illustrating an example of a relationship between the charge and discharge power demand in accordance with the control parameter and the BESS response.

FIG. 3A illustrates an example in a case of determining power at which the charge and discharge of the BESS is initiated in accordance with the control parameter $X_1$ ($X_1>0$). In this case, as illustrated in the drawing, when an absolute value of the charge and discharge power demand, which is represented by the power demand signal that is transmitted from the operation manager of the power transmission network, is less than the value of the control parameter $X_1$, the BESS is controlled not to carry out any of charge and discharge. On the other hand, when the absolute value of the charge and discharge power demand is greater than the control parameter $X_1$, charge or discharge of the BESS is carried out in accordance with the charge and discharge power demand, thereby providing a service for stabilizing power that is supplied from the power transmission network.

FIG. 3B illustrates an example in a case of determining power that restricts the charge and discharge of the BESS in accordance with the control parameter $X_2$ ($X_2>0$). In this case, as illustrated in the drawing, when an absolute value of the charge and discharge power demand, which is represented by the power demand signal that is transmitted from the operation manager of the power transmission network, is greater than a value of the control parameter $X_2$, the BESS is controlled not to further carry out any of charge and discharge. On the other hand, when the absolute value of the charge and discharge power demand is in equal to or less than the control parameter $X_2$, charge or discharge of the BESS is carried out in accordance with the charge and discharge power demand, thereby providing a service for stabilizing power that is supplied from the power transmission network.

FIG. 3C illustrates an example of a case of determining the charge and discharge power of the BESS in accordance with the control parameter $X_3$ ($X_3>0$). In this case, as illustrated in the drawing, the charge and discharge power demand, which is represented by the power demand signal transmitted from the operation manager of the power transmission network, is multiplied by the control parameter $X_3$ as a proportional coefficient to control the charge and discharge power of the BESS.

In a control strategy of the BESS, a plurality of the control parameters $X_1$ to $X_N$ are set, and the operation control of the BESS can be carried out in combination of the control parameters $X_1$ to $X_N$. FIG. 3D illustrates an example in a case of carrying out the operation control of the BESS in combination of the control parameters $X_1$, $X_2$, and $X_3$. As described above, when using the plurality of control parameters in combination, the user can minutely carry out the operation control of the BESS in accordance with a variation in the charge and discharge power demand. As a result, it is possible to realize optimal control so as to maximize the life of the BESS and to maximize the total amount of the profit.

Next, the estimation unit 12 and the optimization unit 13 of the evaluation device 1 will be described in detail. The estimation unit 12 and the optimization unit 13 carry out respective processes by using the following mathematical model, calculation method, and calculation procedure.

Process in Manual Mode

In the element model unit 121 of the estimation unit 12, each constituent element of the BESS is expressed in a state of being modeled by a mathematical expression. The element model unit 121 can calculate charge and discharge power of the BESS, power consumption of the air conditioning system, a battery state, and the like by using a model of each constituent element.

FIG. 4 is a block diagram illustrating a configuration of the element model unit 121 of the estimation unit 12 in the BESS according to an embodiment of the invention. The element model unit 121 includes a control model 1210, a PCS model 1211, a battery model 1212, and a cooling model 1213.

The control model 1210 calculates charge and discharge power $E_{ac}$ of the BESS on the basis of the demand information 22 and the control parameter information 24 which are input to the evaluation device 1 as the input information 2. Specifically, the control model 1210 calculates the charge and discharge power $E_{ac}$ by a mathematical process expressed by the following Expression (1) by using a predetermined function $f_1$ on the basis of the discrete-time signal $E_{demand}$ of the profile information that is represented by the demand information 22, and the respective control parameters $X_1$ to $X_N$ which are represented by the control parameter information 24. In addition, in Expression (1), the charge and discharge power $E_{ac}$ is obtained as a discrete-time signal that varies in one day (24 hours).

$$E_{ac} = f_1(E_{demand}, X_1, \ldots, X_N) \quad \text{Expression (1)}$$

The PCS model 1211 is configured to mathematically formulate the efficiency of the power conditioning system (PCS). The PCS model 1211 calculates DC power $E_{dc}$ at each PCS on the basis of a value of the charge and discharge power $E_{ac}$ that is calculated by the control model 1210, and the number of PCSs which is represented by the specification information 21 that is input to the evaluation device 1 as the input information 2. The DC power $E_{dc}$ represents charge power that is output from the PCS and is input to a battery during charge, and represents discharge power that is output from the battery and is input to the PCS during discharge. In addition, as is the case with the charge and discharge power $E_{ac}$, the DC power $E_{dc}$ is obtained as a discrete-time signal that varies in one day (24 hours). In addition, the PCS model 1211 also calculates loss power $E_{loss}$ due to the power conversion at each PCS on the basis of the charge and discharge power $E_{ac}$ and the DC power $E_{dc}$.

A battery of the BESS can be modeled by an equivalent circuit diagram. The simplest battery equivalent model includes an ideal open-circuit voltage (OCV), and an internal resistor R that is connected thereto in series. Here, it is known that a constant relationship is established between the SOC and the OCV of the battery. The battery model 1212 is configured to mathematically formulate the relationship between the SOC and the OCV of the battery by using the constant relationship. The battery model 1212 calculates a current $I_{cell}$ that flows to each battery, a BESS charged state $S_{total}$ that represents the SOC of the battery in the entirety of the BESS on the basis of a value of the DC power $E_{dc}$ which is calculated by the PCS model 1211, respective specifications of the battery which are represented by the specification information 21 that is input to the evaluation device 1 as the input information 2, and a capacity and an internal resistance value of the battery which are represented by the battery deterioration state 31 that is included in the output information 3. In addition, a method of acquiring data relating to the battery deterioration state 31 will be described later.

The value of the BESS charged state $S_{total}$, which is obtained by the battery model 1212, is fed back to the control model 1210. In a case where the value of the BESS charged state $S_{total}$ at any time step $t_k$ is higher than a maximum value in the SOC permissible range, which is set by the user, in the specification information 21, or is lower than a minimum value in the SOC permissible range, the control model 1210 sets a value of the charge and discharge power $E_{ac}$ at that time to 0. At this time, the BESS does not carry out charge and discharge. In this case, at time step $t_k$, calculation in the PCS model 1211 and the battery model 1212 is carried out in consideration of a newly set value of the charge and discharge power $E_{ac}$.

The cooling model 1213 is configured to mathematically formulate power consumption of a cooling system that is used to suppress an increase in a temperature of the BESS, the PCS, or the battery for adjustment to a preferable operation temperature. The cooling model 1213 calculates power consumption $E_{aux}$ of the cooling system on the basis of the loss power $E_{loss}$ that is calculated by the PCS model 1211, respective specifications of the cooling system which are represented by the specification information 21 that is input to the evaluation device 1 as the input information 2, and a current $I_{cell}$ of a battery which is calculated by the battery model 1212.

As described above, the element model unit 121 can obtain the charge and discharge power $E_{ac}$ in accordance with the control parameter which is used to charge and discharge the battery in the BESS, the power consumption $E_{aux}$ that is consumed by the BESS, the current $I_{cell}$ of the battery in accordance with the charge and discharge power $E_{ac}$, and the BESS charged state $S_{total}$ on the basis of the input information 2.

In addition, as illustrated in FIG. 4, an input to the element model unit 121 includes the specification information 21, the demand information 22, the control parameter information 24, and the battery deterioration state 31. In addition, as illustrated in FIG. 4, an output of the element model unit 121 includes the charge and discharge power $E_{ac}$ that represents AC power that is input to and output from the BESS, the BESS charged state $S_{total}$ that is calculated on the basis of the charge and discharge power $E_{ac}$ and represents a state of charge of the battery in the entirety of the BESS, the power consumption $E_{aux}$ that is consumed by the operation of the cooling system in accordance with the charge and discharge power Esc, and the current $I_{cell}$ of the battery.

FIG. 5 is a block diagram illustrating a configuration of the battery deterioration model unit 122 of the estimation unit 12 in the BESS according to the embodiment of the invention. The battery deterioration model unit 122 includes a battery capacity attenuation model 1220, and an internal resistance increase model 1221.

With respect to the battery that is used in the BESS, typically, battery deterioration modeling relating to a battery capacity attenuation and an internal resistance increase which occur due to deterioration of the battery is carried out on the basis of an experimental result of a battery manufacturer, and the like. In the evaluation device 1 of this embodiment, it is assumed that the operation of the BESS is conducted in accordance with one charge and discharge cycle, and the same charge and discharge cycle is continuously repeated. In this case, the capacity and the internal resistance of the battery at time t depends on the number of times of charge and discharge cycles which are carried out up to the time t, a battery current $I_{new}$ and a BESS charged state $S_{new}$ at an initial cycle (at the time of initiating the charge and discharge cycle), and an operation temperature T of the BESS.

Accordingly, an amount of attenuation $\Delta Q(t)$ ($\Delta Q(t)>0$) of the battery capacity from an initial state at time t is defined by the following Expression (2) using a predetermined function $f_2$.

$$\Delta Q(t)=f_2(t,I_{new},S_{new},T) \quad \text{Expression (2)}$$

In addition, an amount of increase $\Delta R(t)$ ($\Delta R(t)>0$) of the internal resistance of the battery from an initial state at time t is defined by the following Expression (3) using a predetermined function $f_3$.

$$\Delta R(t)=f_3(t,I_{new},S_{new},T) \quad \text{Expression (3)}$$

Accordingly, the capacity Q(t) and the internal resistance R(t) of the battery at time t are calculated by the following Expression (4) and Expression (5), respectively.

$$Q(t)=Q_{initial}-\Delta Q(t) \quad \text{Expression (4)}$$

$$R(t)=R_{initial}+\Delta R(t) \quad \text{Expression (5)}$$

In Expression (4) and Expression (5), $Q_{initial}$ and $R_{initial}$ represent values of an initial capacity and an initial internal resistance of the battery, which are set by a user, in the specification information 21, respectively. In addition, $\Delta Q(t)$ and $\Delta R(t)$ represent values of a capacity and an internal resistance of the battery, which are calculated by Expression (2) and Expression (3), at time t, respectively.

In the battery deterioration model unit 122 illustrated in FIG. 5, the battery capacity attenuation model 1220 calculates a battery capacity in each year by using Expression (2) and Expression (4). In addition, the internal resistance increase model 1221 calculates an internal resistance in each year by using Expression (3) and Expression (5). That is, the battery capacity attenuation model 1220 and the internal resistance increase model 1221 substitutes time t in accordance with the number of years from operation initiation of the BESS for Expression (2) and Expression (3) to obtain an amount of decrease in the battery capacity and an amount of increase in the internal resistance for each year. On the basis of the calculation results, the battery capacity attenuation model 1220 and the internal resistance increase model 1221 calculate values of the battery capacity and the internal resistance for each year by using Expression (4) and Expression (5). In addition, in Expression (2) and Expression (4), a battery current $I_{new}$ and a BESS charged state $S_{new}$ at an initial cycle are calculated as a battery current $I_{cell}$ and a BESS charged state $S_{total}$ when Q is set to $Q_{initial}$ and R is set to $R_{initial}$ in the element model unit 121 illustrated with reference to FIG. 4, respectively.

The battery deterioration model unit 122 outputs values of the battery capacity at respective years, which are calculated as described above, as $Q_{initial}$, $Q(y_1)$, $Q(y_2)$, . . . , $Q(y_Y)$. In addition, values of the internal resistance at respective years, which are calculated, are output as $R_{initial}$, $R(y_1)$, $R(y_2)$, . . . , $R(y_Y)$. Here, $y_1, y_2, \ldots, y_Y$ represent respective years from operation initiation of the BESS. The outputs from the battery deterioration model unit 122 are referenced as the battery deterioration state 31 in the output information 3.

The battery deterioration state 31, which is output from the battery deterioration model unit 122, is input to the element model unit 121 in FIG. 4, and is used for calculation in the battery model 1212. A relationship between the element model unit 121 and the battery deterioration model unit 122 will be described below.

FIG. 6 is a flowchart illustrating a process flow in the element model unit 121 and the battery deterioration model unit 122. Hereinafter, description will be given of a configuration in which the element model unit 121 and the battery deterioration model unit 122 how to cooperate to calculate respective variables, which is used for evaluation of the BESS, with reference to the flowchart in FIG. 6.

In step S1, the element model unit 121 and the battery deterioration model unit 122 carry out initiation of the respective variables. Here, a counter k is set to 0, and a battery capacity value $Q(y_0)$ and an internal resistance value $R(y_0)$ in a $0^{th}$ year, that is, at an initial cycle are set to $Q_{initial}$ and $R_{initial}$, respectively. In addition, the counter k takes an integer value from 0 to Y.

In step S2, the element model unit 121 calculates an initial value of each of the variables on the basis of the specification information 21, the demand information 22, and the control parameter information 24 which are included in the input information 2. Specifically, the element model unit 121 calculates charge and discharge power $E_{ac}(y_0)$ in the $0^{th}$ year, that is, at the initial cycle in accordance with Expression (1). In addition, the element model unit 121 calculates a battery current $I_{cell}(y_0)$ and a BESS charge state $S_{total}(y_0)$ in the $0^{th}$ year as the battery current $I_{new}$ and the BESS charged state $S_{new}$ at the initial cycle. In addition, the element model unit 121 calculates a power consumption $E_{aux}(y_0)$ of the cooling system at the initial cycle.

In step S3, the battery deterioration model unit 122 calculates battery capacity values $Q(y_1), Q(y_2), \ldots, Q(y_Y)$, and internal resistance values $R(y_1), R(y_2), \ldots R(y_Y)$ in respective years from a $1^{st}$ year to a $Y^{th}$ year by using Expression (2) to Expression (4).

In step S4, the battery deterioration model unit 122 compares the battery capacity values and the internal resistance values in the respective years which are calculated in step S3, and predetermined threshold values with each other, and calculates an end-of-life year $y_{eol}$, which is expected as a year in which the battery reaches the life end, on the basis of the comparison result. As the threshold values at that time, for example, values that are provided from a battery manufacturer and the like are used. Typically, the battery life is defined by the value of the battery capacity.

In step S5, the element model unit 121 carries out calculation of incrementing the counter k by one.

In step S6, the element model unit 121 calculates respective variables in a $k^{th}$ year by using the battery capacity value $Q(y_k)$ and the internal resistance value $R(y_k)$ in the $k^{th}$ year, which are calculated in step S3, in accordance with a value of the counter k that is incremented in step S5. Specifically, the element model unit 121 calculates charge and discharge power $E_{ac}(y_k)$, a battery current $I_{cell}(y_k)$ that corresponds to the charge and discharge power $E_{ac}(y_k)$, a BESS charged state $S_{total}(y_k)$, and power consumption $E_{aux}(y_k)$ of the cooling system.

The element model unit 121 repetitively carries out the processes in step S5 and step S6 as described above until charge and discharge power $E_{ac}(y_{eol})$ and a BESS charged state $S_{total}(y_{eol})$ in the end-of-life year $Y_{eol}$ of the battery are calculated. In addition, the element model unit 121 outputs charge and discharge power $E_{ac}(y_0), E_{ac}(y_1), \ldots, E_{ac}(y_{eol})$, BESS charged states $S_{total}(y_0), S_{total}(y_1), \ldots, S_{total}(y_{eol})$, and power consumption $E_{aux}(y_0), E_{aux}(y_1), \ldots, E_{aux}(y_{eol})$ of the cooling system in respective years, which are calculated from the initial cycle to the end-of-life year of the battery, as the BESS variable 32 that is included in the output information 3.

As described above, the battery deterioration model unit 122 predicts a deterioration state of the battery in the future on the basis of the battery current $I_{cell}$ and the BESS charged state $S_{total}$ which are obtained by the element model unit 121, and can obtain the end-of-life year $y_{eol}$ that represents the life of the battery.

FIG. 7 is a block diagram illustrating a configuration of the profit calculation unit 123 of the estimation unit 12 in the BESS according to the embodiment of the invention. The profit calculation unit 123 includes a revenue algorithm unit 1231, a loss calculation unit 1232, and a difference calculation unit 1233.

The revenue algorithm unit 1231 carries out calculation in an aspect of profit in accordance with the power stabilization service that is provided for an operation manager of a power transmission network that is designated by the price information 23. In this embodiment, it is assumed that, for example, frequency control is carried out as the power stabilization service. The revenue algorithm unit 1231 calculates an amount of revenue which an owner of the BESS receives on the basis of the demand information 22 and the price information 23 which are input to the evaluation device 1 as the input information 2, and the charge and discharge power $E_{ac}(y_k)$ that is calculated by the element model unit 121. Specifically, the revenue algorithm unit 1231 calculates a revenue per one day in a $k^{th}$ year by using a demand variation cycle of the charge and discharge power which is represented by the profile information of the demand information 22, a service providing price that is represented by the price information 23, and the charge and discharge power $E_{ac}(y_k)$. Then, the revenue algorithm unit 1231 multiplies the obtained revenue per one day by 365, thereby calculating an amount of revenue $P_{revenue}(y_k)$ in the $k^{th}$ year.

The loss calculation unit 1232 calculates pecuniary loss due to operation of the cooling system of the BESS. Specifically, the loss calculation unit 1232 calculates the pecuniary loss per one day in the $k^{th}$ year on the basis of the power consumption $E_{aux}(y_k)$ of the cooling system which is calculated by the element model unit 121. Then, the loss calculation unit 1232 multiplies the obtained pecuniary loss per one day by 365, thereby calculating an amount of loss $P_{loss}(y_k)$ in the $k^{th}$ year.

The difference calculation unit 1233 subtracts the amount of loss $P_{loss}(y_k)$ that is calculated in the loss calculation unit 1232 from the amount of revenue $P_{revenue}(y_k)$ that is calculated in the revenue algorithm unit 1231 in accordance with the following Expression (6), thereby calculating a difference therebetween. In addition, the difference that is obtained is output as a pecuniary profit $P_{profit}(y_k)$ in the $k^{th}$ year.

$$P_{profit}(y_k) = P_{revenue}(y_k) - P_{loss}(y_k) \qquad \text{Expression (6)}$$

The profit calculation unit 123 carries out the above-described calculation for each year from the operation initiation year $y_0$ of the BESS to the end-of-life year $y_{eol}$. According to this, it is possible to calculate a profit for each year which the owner of the BESS can receive in compensation for the power stabilization service. The profit for each year, which is calculated in the profit calculation unit 123, is referenced as the profit 33 in the output information 3.

As described above, the profit calculation unit 123 can calculate the pecuniary profit $P_{profit}(y_k)$, which is to be obtained for each year, on the basis of the charge and discharge power $E_{ac}(y_k)$ and the power consumption $E_{aux}(y_k)$ which are obtained by the element model unit 121. In addition, in this embodiment, description has been given of an example in which one year is set as a unit of a pecuniary profit calculating period, but the invention is not limited thereto. That is, with regard to an arbitrary unit period, the profit calculation unit 123 can calculate the pecuniary profit that is obtained in the period.

As described above, in the evaluation device 1, the estimation unit 12 can obtain various variables or values which are used for evaluation of the BESS. Calculation results thereof are stored as the battery deterioration state 31, the BESS variable 32, and the profit 33, which are included in the output information 3, in the data storage unit 14.

A user can perform simulation in accordance with a various setting conditions by changing the contents of the input information 2 in the evaluation device 1. In addition, a combination of the input information 2 that defines the setting condition and the output information 3 that is obtained under the setting condition can be stored in the data storage unit 14 as a simulation result. That is, the data storage unit 14 can store a plurality of simulation results under setting conditions different from each other. Hereinafter, description will be given on the assumption that at least two simulation results are stored in the data storage unit 14.

FIG. 8 is a block diagram illustrating a configuration of the optimization unit 13 in the BESS according to the embodiment of the invention. The optimization unit 13 includes an accumulated profit calculation unit 131, a comparison unit 132, and an optimal solution derivation unit 133.

The accumulated profit calculation unit 131 calculates a total accumulated profit of the BESS on the basis of the specification information 21 that is input to the evaluation device 1 as the input information 2, and the pecuniary profit $P_{profit}(y_k)$, which is calculated by the profit calculation unit 123 in the estimation unit 12, for each year from the operation initiation year $y_0$ of the BESS to the end-of-life year $y_{eol}$. Specifically, the accumulated profit calculation unit 131 calculates a total accumulated profit $P_{total}$, which the owner of the BESS can obtain from operation initiation of the BESS to operation termination thereof, on the basis of the following Expression (7). In Expression (7), $P_{cost}$ represents an investment cost for installation of the BESS, and can be determined on the basis of the contents of the specification information 21, and the like.

$$P_{total} = -P_{cost} + \sum_{k=0}^{y_{eol}} P_{profit}(y_k) \quad \text{Expression (7)}$$

The comparison unit 132 carries out comparison of respective simulation results by comparing a plurality of total accumulated profits which are calculated in accordance with a plurality of sets of control parameter values different from each other. Specifically, the comparison unit 132 compares a value of a total accumulated profit $P_{total}$ in accordance with a newest simulation result which is calculated in the accumulated profit calculation unit 131, and a value of a total accumulated profit $P_{total}$ in accordance with a past simulation result that is stored in the data storage unit 14. According to this, values of a plurality of total accumulated profits $P_{total}$, which are calculated in accordance with control parameter values set by the control parameter information 24, for respective simulations are compared with each other. In addition, the comparison unit 132 ranks the total accumulated profits $P_{total}$ for respective simulations on the basis of the comparison result.

As described above, a user can select the manual mode or the optimization mode during setting of the control parameter. In a case where the manual mode is selected, the optimization unit 13 determines an optimal BESS control strategy on the basis of the comparison result of the comparison unit 132. Specifically, the optimization unit 13 determines a combination of control parameters, with which the total accumulated profit $P_{total}$ up to the end-of-life year $y_{eol}$ becomes the maximum, on the basis of the ranking result of the total accumulated profit $P_{total}$ in the comparison unit 132. The optimal total accumulated profit $P_{total}$ and a value of the control parameter which are determined as described above are referenced as a total accumulated profit 34 and an optimal control parameter value 35 in the output information 3.

When the optimization mode is selected, the optimal solution derivation unit 133 obtains an optimal control parameter value in a range that is set by a user. Specifically, a combination of control parameters, with which the total accumulated profit $P_{total}$ up to the end-of-life year $y_{eol}$ becomes the maximum, is determined in a range between the minimum value and the maximum value which are set in the control parameter information 24 among a plurality of pieces of the input information 2. As is the case with the manual mode, the total accumulated profit $P_{total}$ and the control parameter value, which are determined as described above and are optimal, are referenced as the total accumulated profit 34 and the optimal control parameter value 35 in the output information 3.

As described above, the optimization unit 13 determines an optimal control parameter value, which is optimal for operation control of the BESS, on the basis of the end-of-life year $y_{eol}$ of the battery and the pecuniary profit $P_{profit}(y_k)$ which are estimated by the estimation unit 12.

FIG. 9 is a diagram illustrating a screen example of a simulation result that is displayed on a GUI of the evaluation device 1. An example in a case of comparing and displaying two simulation results is illustrated on a screen of FIG. 9. The simulation results are obtained as follows. With regard to the specification information 21, the demand information 22, and the price information 23 in the input information 2, the same value is set in each case. In addition, with regard to the control parameter information 24, values different from each other are set as a control parameter. FIG. 9 illustrates an example in which respective simulation results are displayed on a screen in a state in which one simulation condition is set as a "scenario A", and the other simulation condition is set as a "scenario B".

The screen of FIG. 9 illustrates respective comparison results of the battery deterioration state 31, the BESS variable 32, the profit 33, the total accumulated profit 34, and the optimal control parameter value 35, which are included in the output information 3, with respect to the scenario A and the scenario B.

With regard to the battery deterioration state 31, an attenuation aspect of the battery capacity and an increase aspect of the internal resistance of the BESS in each of the scenarios A and B are displayed with graphs on the screen of FIG. 9. In the graphs, the horizontal axis represents time in a year unit.

With regard to the BESS variable 32, a variation aspect of the SOC in a $3^{rd}$ year in each of the scenarios A and B is displayed with a graph on the screen of FIG. 9. In the graph, the horizontal axis represents time (hours). On the screen of FIG. 9, a user can select a kind of a waveform (variable) and a year, which are objects to be displayed with the graph, in information represented by the BESS variable 32. Here, a range of years, which can be selected, is from a $0^{th}$ year to the maximum value of a final year (end-of-life year $y_{eol}$ of the battery) in the simulation results in the respective scenarios. That is, when the end-of-life year of the battery in the scenario A is represented as $y_{eolA}$, and the end-of-life year of the battery in the scenario B is represented as $y_{eolB}$, the user can select a year, which is an object to be displayed with a graph, in a state in which the greatest value between $y_{eolA}$ and $y_{eolB}$ is set as the upper limit. In addition, the user can select any of the charge and discharge power $E_{ac}(y_k)$, the BESS charged state $S_{total}(y_k)$, and the power consumption $E_{aux}(y_k)$ of the cooling system in each year, which are obtained by the estimation unit 12 and are output as the BESS variable 32, as a variable that is an object to be displayed with a graph. Here, with regard to the variable that is selected, a waveform representing a variation in a value for each hour, which is calculated in each of the scenarios A and B, in a selected year is displayed with a graph on the screen of FIG. 9.

With regard to the profit 33, a value of the pecuniary profit $P_{profit}(y_k)$ in each year in each of the scenarios A and B is collectively displayed in a table format on the screen of FIG. 9.

With regard to the total accumulated profit 34, an accumulated value of the pecuniary profit $P_{profit}(y_k)$ in each year in each of the scenarios A and B is displayed with a graph on the screen of FIG. 9. In the graph, the horizontal axis represents time in a year unit. The maximum value of each curve on the graph, that is, a value on a right end represents a value of the final total accumulated profit $P_{total}$ in each of the scenarios A and B.

With regard to the optimal control parameter value 35, each control parameter value in a scenario (here, the scenario B), in which the total accumulated profit $P_{total}$ becomes the maximum, between the scenarios A and B is illustrated on the screen of FIG. 9.

In addition, FIG. 9 illustrates a display screen example in a case of carrying out simulation in a state in which a user selects the manual mode, and two kinds of control parameter combinations are set as the scenarios A and B. In the example of FIG. 9, it can be seen that each control parameter value that is set in the scenario B is displayed as the optimal control parameter value 35.

Process in Optimization Mode

On the other hand, in a case where the user selects the optimization mode, as described above, the optimal solution derivation unit 133 of the optimization unit 13 determines a control parameter combination, with which the total accumulated profit $P_{total}$ becomes the maximum, in a range that is set in the control parameter information 24 by using a model that is embedded in advance. In this case, with regard to information other than the control parameter information 24 in the input information 2, that is, the specification information 21, the demand information 22, and the price information 23, as is the case with the manual mode, the user sets a value thereof. The GUI of the evaluation device 1 displays an optimal control parameter value that is determined as described above, and a simulation result corresponding thereto on a screen by using the same expression format as that illustrated in FIG. 9.

As described above, when using the evaluation device 1 of this embodiment, in both of the manual mode and the optimization mode, the user can acquire an optimal value of the control parameter with which the life of the BESS and the total accumulated profit become the maximum. Accordingly, it is possible to easily carry out economical evaluation when providing the power stabilization service using the BESS to the power transmission network. As a result, it is possible to easily select a control parameter value in accordance with a strategy for obtaining an economical profit.

FIG. 10 is a flowchart illustrating an overall process flow of the evaluation device 1.

In step S10, the evaluation device 1 sets scenario data. Here, the evaluation device 1 allows a user to input the input information 2 on the display screen illustrated in FIG. 2 so as to set scenario data that is used for simulation.

In step S20, the evaluation device 1 acquires the input information 2. Here, the evaluation device 1 fetches the input information 2, which is set as scenario data in step S10, by using the estimation unit 12.

In step S30, the evaluation device 1 calculates each variable that is used for evaluation of the BESS. Here, the evaluation device 1 carries out the above-described processes on the basis of the specification information 21, the demand information 22, the price information 23, and the control parameter information 24, which are included in the input information 2 that is acquired in step S20, by using the estimation unit 12. According to this, the charge and discharge power $E_{ac}(y_k)$, the BESS charged state $S_{total}(y_k)$, the power consumption $E_{aux}(y_k)$ of the cooling system, and the like in each year are obtained.

In step S40, the evaluation device 1 estimates the battery life and the pecuniary profit on the basis of each variable that is calculated in step S30. Here, the evaluation device 1 carries out the above-described processes on the basis of the charge and discharge power $E_{ac}(y_k)$, the BESS charged state $S_{total}(y_k)$, the power consumption $E_{aux}(y_k)$ of the cooling system, and the like in each year which are calculated in step S30 by using the estimation unit 12. According to this, the end-of-life year $y_{eol}$ of the battery and the pecuniary profit $P_{profit}(y_k)$ in each year up to the end-of-life year $y_{eol}$ are obtained.

In step S50, the evaluation device 1 calculates the total accumulated profit, which is obtained by operation of the BESS, on the basis of the battery life and the pecuniary profit which are estimated in step S40. Here, the evaluation device 1 carries out the above-described processes on the basis of the end-of-life year $y_{eol}$ and the pecuniary profit $P_{profit}(y_k)$ in each year which are calculated in step S40 by using the optimization unit 13. According to this, the total accumulated profit $P_{total}$ is obtained.

In step S60, the evaluation device 1 determines whether or not to terminate the simulation. In a case of the manual mode, when it enters a state in which the simulation is carried out at least two or more times and is completed, and a user carries out a predetermined operation indicating termination of the simulation, it is determined in step S60 that simulation is terminated, and the process proceeds to step S70. In addition, in a case where a past simulation result is stored in the data storage unit 14, it is not necessary to carry out the simulation two or more times. In addition, in the case of the optimization mode, when the total accumulated profit is correctly calculated in the process of step S50, it is determined in step S60 that the simulation is terminated, and the process proceeds to step S70. On the other hand, when the above-described conditions are not satisfied, the evaluation device 1 determines as "No" in step S60. In this case, process returns to step S10, and the processes subsequent to step S10 are carried out again.

In step S70, the evaluation device 1 determines an optimal control parameter on the basis of a total accumulated profit in each scenario which is calculated in step S50. At this time, the evaluation device 1 carries out the above-described processes in accordance with the mode selected by a user, and obtains an optimal value of the control parameter. Specifically, in a case where the manual mode is selected, the evaluation device 1 selects a scenario, in which the total accumulated profit calculated in step S50 is the greatest, among a plurality of scenarios of which execution of simulation is completed by using the optimization unit 13. In addition, each control parameter value that is set by the user in the scenario that is selected is determined as the optimal control parameter. On the other hand, in a case where the optimization mode is selected, in a range of each control parameter set by a user, the evaluation device 1 determines a value, with which the total accumulated profit calculated in step S50 becomes the maximum, as the optimal control parameter by using the optimization unit 13.

When the optimal control parameter is determined in step S70, the evaluation device 1 terminates the processes illustrated in the flowchart of FIG. 10.

In addition, the data storage unit 14 can store a program that allows the evaluation device 1 to carry out the processes illustrated in the flowchart of FIG. 10. When an operation process in accordance with the program is executed by a computer such as CPU, the evaluation device 1 can realize the above-described processes.

According to the above-described embodiment of the invention, the following operational effects are exhibited.

(1) The evaluation device 1 evaluates a BESS that is a power storage system which includes a chargeable and dischargeable battery and provides a power stabilization service with respect to a power transmission network by using the battery. The evaluation device 1 includes the information acquisition unit 11 that acquires the input information 2 including at least the specification information 21 relating to specifications of the BESS, the estimation unit 12 that estimates the life of the battery and the pecuniary profit in compensation for the service on the basis of the input information 2 that is acquired by the information acquisition unit 11, and the optimization unit 13 that determines a value of a control parameter, which is optimal for operation control of the BESS, on the basis of the life of the battery and the pecuniary profit which are estimated by the estimation unit 12. According to this configuration, with respect to the BESS that provides the power stabilization service for the power transmission network, it is possible to determine a control parameter which is optimal for operation control of the BESS.

(2) The estimation unit 12 includes the element model unit 121, the battery deterioration model unit 122, and the profit calculation unit 123. The element model unit 121 obtains the charge and discharge power $E_{ac}(y_k)$ in accordance with the control parameter which is used to charge and discharge the battery in the BESS, the power consumption $E_{aux}(y_k)$ that is consumed by the BESS, the current $I_{cell}(y_k)$ of the battery in accordance with the charge and discharge power $E_{ac}(y_k)$, and the BESS charged state $S_{total}(y_k)$ on the basis of the input information 2. The battery deterioration model unit 122 predicts the deterioration state of the battery in the future on the basis of the current $I_{cell}(y_k)$ and the BESS charged state $S_{total}(y_k)$ which are obtained by the element model unit 121, and obtains the end-of-life year $y_{eol}$ that represents the life of the battery. The profit calculation unit 123 calculates the pecuniary profit $P_{profit}(y_k)$ that is obtained in a predetermined unit period on the basis of the charge and discharge power $E_{ac}(y_k)$ and the power consumption $E_{aux}(y_k)$ which are obtained by the element model unit 121. According to this configuration, the estimation unit 12 can reliably and accurately estimate the life of the battery and the pecuniary profit in compensation for the service on the basis of the input information 2.

(3) The optimization unit 13 includes the accumulated profit calculation unit 131 and the comparison unit 132. The accumulated profit calculation unit 131 accumulates the pecuniary profit $P_{profit}(y_k)$ for each unit period which is calculated by the profit calculation unit 123, and calculates the total accumulated profit $P_{total}$ of the BESS which is obtained during the life of the battery. The comparison unit 132 compares a plurality of the total accumulated profits $P_{total}$ which are calculated in accordance with values of control parameters, each being different in each scenario. The optimization unit 13 determines an optimal control parameter value on the basis of the comparison result of the comparison unit 132 by using the comparison unit 132 (in a case of the manual mode) or the optimal solution derivation unit 133 (in a case of the optimization mode). According to this configuration, the optimization unit 13 can reliably determine the control parameter value that is optimal for operation control of the BESS.

(4) It is preferable that the input information 2 further includes demand information 22 relating to a charge and discharge power demand with respect to the BESS, price information 23 relating to a price of the service, and control parameter information 24 relating to the control parameter. According to this configuration, in the estimation unit 12, the element model unit 121 can obtain the charge and discharge power $E_{ac}(y_k)$ on the basis of the demand information 22 and the control parameter information 24, and can obtain the power consumption $E_{aux}(y_k)$, the current $I_{cell}(y_k)$, and the BESS charge state $S_{total}(y_k)$ on the basis of the charge and discharge power $E_{ac}(y_k)$ and the specification information 21. In addition, the profit calculation unit 123 can calculate the pecuniary profit $P_{profit}(y_k)$, which is obtained in a unit period, on the basis of the demand information 22, the price information 23, the charge and discharge power $E_{ac}(y_k)$, and the power consumption $E_{aux}(y_k)$. According to this, it is possible to more accurately estimate the life of the battery and the pecuniary profit that is obtained in compensation for the service by using the estimation unit 12. In addition, it is possible to more accurately determine the control parameter, which is optimal for operation control of the BESS, by using the optimization unit 13.

(5) The evaluation device 1 further includes the data storage unit 14 that stores a relationship between the control parameter, the life of the battery, and the pecuniary profit. According to this configuration, a plurality of scenarios, of which control parameter values are different from each other, can be set, and a simulation result in accordance with each of the scenario can be stored.

(6) The evaluation device 1 outputs the output information 3 for display of a screen as illustrated in FIG. 9 which illustrates a comparison result of a pecuniary profit for each control parameter. According to this configuration, a user can easily carry out comparison and examination of a simulation result that is different for each scenario.

In addition, the invention is not limited to the content of the above-described embodiment. As a modification example of the invention, for example, conditions during selection of the control parameter value as an optimal control strategy from the simulation result may be appropriately changed in accordance with desired conditions of a user. In addition, the evaluation device 1 may be mounted as a part of the BESS, or may be provided at a site different from that of the BESS. In a case of providing the evaluation device 1 at a site different from that of the BESS, these may be connected to each other through a communication unit such as the Internet. In addition, as the initial values of the battery capacity and the internal resistance which are used for simulation, current values or values at a specific point of time may be set. According to this configuration, it is possible to carry out analysis in accordance with a current BESS state or a BESS state at a specific point of time.

In addition, the profile information relating to the demand for the charge and discharge power in the demand information 22 is not limited to the setting in a range of 24 hours similar to the embodiment. That is, the profile information may be set in a range shorter than 24 hours, or in a range longer than 24 hours, for example, in a time scale such as several days, several weeks, and several months. In addition, the service providing price in the price information 23, the control parameter value in the control parameter information 24, and the like may be set in an arbitrary time unit. That is, these may be set in a time unit shorter than one hour, or in a time unit such as several hours and several days without limitation to the setting for each hour similar to the embodiment. In addition, calculation contents such as an amount of attenuation in the battery capacity and an amount of increase in the internal resistance may be appropriately modified in a range not departing from the object of the invention.

The control parameters which are used for control of the BESS are not limited to those illustrated in FIGS. 3A to 3C. In addition, as illustrated in FIGS. 3A and 3B, the control parameters may be configured not to cause an influence symmetrical to the charge and discharge. In addition, dealing during provision of the power stabilization service with respect to the power transmission network may be different between charge and discharge. The definition or setting of the control parameter may be carried out in consideration of the above-described viewpoint.

In the invention, the BESS, that is an object to be evaluated by the evaluation device 1, is not limited to a configuration of providing only one power stabilization service to the operation manager of the power transmission network. In a case of setting a BESS, which provides a plurality of services, as an object to be evaluated, it is preferable that the output information 3 from the evaluation device 1 is dealt in classification for each service. On the other hand, it is preferable that the total accumulated profit obtained by the BESS is calculated as the sum of profits in all services.

The above-described embodiment and various modification examples are illustrative only, and the invention is not limited to the content of the invention as long as the characteristics of the invention are not damaged. The invention is not limited to the above-described embodiment or the modification examples, and various modifications can be made in a range not departing from the gist of the invention.

What is claimed is:

1. An evaluation device for evaluating a power storage system which includes a chargeable and dischargeable battery and provides a power stabilization service with respect to a power transmission network by using the battery, the evaluation device comprising:
    an information acquisition unit that acquires input information including at least specification information of the power storage system;
    an estimation unit that estimates a life of the battery and a pecuniary profit in compensation for the power stabilization service provided with respect to the power transmission network by using the battery on the basis of the input information including the specification information of the power storage system that is acquired by the information acquisition unit, demand information relating to a charge and discharge power demand with respect to the power storage system, price information relating to a price of the power stabilization service, and control parameter information relating to a control parameter; and
    an optimization unit that determines a value of the control parameter, which is optimal for control of an operation of the power storage system, on the basis of the life of the battery and the pecuniary profit in compensation for the power stabilization service to suppress variation in a frequency or a voltage of power that flows through the power transmission network, which are estimated by the estimation unit.

2. The evaluation device for a power storage system according to claim 1,
    wherein the estimation unit includes,
    an element model unit that obtains charge and discharge power in accordance with the control parameter that is used to charge and discharge the battery in the power storage system, power consumption that is consumed in the power storage system, and a current and a state of charge of the battery in accordance with the charge and discharge power on the basis of the input information,
    a battery deterioration model unit that predicts a deterioration state of the battery in the future and obtains the life of the battery on the basis of the current and the state of charge which are obtained by the element model unit, and
    a profit calculation unit that calculates the pecuniary profit that is obtained in a predetermined unit period on the basis of the charge and discharge power and the power consumption which are obtained by the element model unit.

3. The evaluation device for a power storage system according to claim 2,
    wherein the optimizing unit includes,
    an accumulated profit calculation unit that accumulates the pecuniary profit for each unit period which is calculated by the profit calculation unit, and calculates a total accumulated profit of the power storage system which is obtained during the life of the battery, and
    a comparison unit that compares a plurality of the total accumulated profits which are calculated in accordance with values of control parameters different from each other, and
    wherein a value of an optimal control parameter is determined on the basis of a comparison result of the comparison unit.

4. The evaluation device for a power storage system according to claim 2,
    wherein the element model unit obtains the charge and discharge power on the basis of the demand information and the control parameter information, and obtains the power consumption, the current, and the state of charge on the basis of the charge and discharge power and the specification information.

5. The evaluation device for a power storage system according to claim 2,
    wherein the profit calculation unit calculates the pecuniary profit that is obtained in the unit period on the basis of the demand information, the price information, the charge and discharge power, and the power consumption.

6. The evaluation device for a power storage system according to claim 1, further comprising:
    a data storage unit that stores a relationship between the control parameter, the life of the battery, and the pecuniary profit.

7. The evaluation device for a power storage system according to claim 1,
    wherein output information for display of a screen, which illustrates a comparison result of the pecuniary profit for each control parameter, is output.

8. An evaluation method for a power storage system which includes a chargeable and dischargeable battery and provides a power stabilization service with respect to a power transmission network by using the battery, the method comprising:
    allowing a computer to acquire input information including at least specification information of the power storage system;
    allowing the computer to estimate a life of the battery and a pecuniary profit in compensation for the power stabilization service provided with respect to the power transmission network by using the battery on the basis of the input information including the specification information of the power storage system that is acquired, demand information relating to a charge and discharge power demand with respect to the power storage system, price information relating to a price of the power stabilization service, and control parameter information relating to a control parameter; and
    allowing the computer to determine a value of the control parameter, which is optimal for control of an operation of the power storage system, on the basis of the life of the battery and the pecuniary profit in compensation for the power stabilization service to suppress variation in a frequency or a voltage of power that flows through the power transmission network, which are estimated.

9. An evaluation program for evaluating a power storage system which includes a chargeable and dischargeable battery and provides a power stabilization service with respect to a power transmission network by using the battery, the evaluation program allowing a computer to execute:
    a process of acquiring input information including at least specification information of the power storage system;

a process of estimating a life of the battery and a pecuniary profit in compensation for the power stabilization service provided with respect to the power transmission network by using the battery on the basis of the input information including the specification information of the power storage system that is acquired, demand information relating to a charge and discharge power demand with respect to the power storage system, price information relating to a price of the power stabilization service, and control parameter information relating to a control parameter; and a process of determining a value of the control parameter, which is optimal for control of an operation of the power storage system, on the basis of the life of the battery and the pecuniary profit in compensation for the power stabilization service to suppress variation in a frequency or a voltage of power that flows through the power transmission network, which are estimated.

* * * * *